(12) United States Patent
Vankipuram et al.

(10) Patent No.: US 11,321,034 B2
(45) Date of Patent: May 3, 2022

(54) DETECTED MEDIA PRINTING WITH COMMUNICATIVELY LINKED DEVICES

(71) Applicant: Hewlett-Packard Development Company, L.P., Spring, TX (US)

(72) Inventors: Mithra Vankipuram, Palo Alto, CA (US); Rafael Ballagas, Palo Alto, CA (US); Alexander Thayer, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/054,830

(22) PCT Filed: Sep. 26, 2018

(86) PCT No.: PCT/US2018/052993
§ 371 (c)(1),
(2) Date: Nov. 12, 2020

(87) PCT Pub. No.: WO2020/068077
PCT Pub. Date: Apr. 2, 2020

(65) Prior Publication Data
US 2021/0240423 A1 Aug. 5, 2021

(51) Int. Cl.
*G06F 3/12* (2006.01)
*G06F 16/901* (2019.01)
*G06F 16/908* (2019.01)

(52) U.S. Cl.
CPC .......... *G06F 3/1265* (2013.01); *G06F 3/1204* (2013.01); *G06F 3/1243* (2013.01); *G06F 16/901* (2019.01); *G06F 16/908* (2019.01)

(58) Field of Classification Search
None
See application file for complete search history.

(56) References Cited

U.S. PATENT DOCUMENTS

| | | | |
|---|---|---|---|
| 6,564,225 | B1 | 5/2003 | Brogliatti et al. |
| 7,943,473 | B2 | 5/2011 | Ellul et al. |
| 8,511,575 | B2 | 8/2013 | Cok |
| 9,247,306 | B2 | 1/2016 | O'Keefe et al. |
| 10,021,049 | B2 | 7/2018 | Hwang et al. |
| 2004/0096123 | A1 | 5/2004 | Shih et al. |
| 2006/0198559 | A1 | 9/2006 | Manico et al. |
| 2008/0034038 | A1 | 2/2008 | Ciudad et al. |
| 2012/0102403 | A1 | 4/2012 | Pennington et al. |

*Primary Examiner* — Lennin R Rodriguezgonzalez
(74) *Attorney, Agent, or Firm* — HP Inc. Patent Department

(57) ABSTRACT

An example communication device includes a camera to detect media. A processor is to link the detected media with a stored version of the detected media in a database. The processor is to instruct a printing device associated with a remote device to output a hardcopy of the stored version of the detected media.

12 Claims, 16 Drawing Sheets

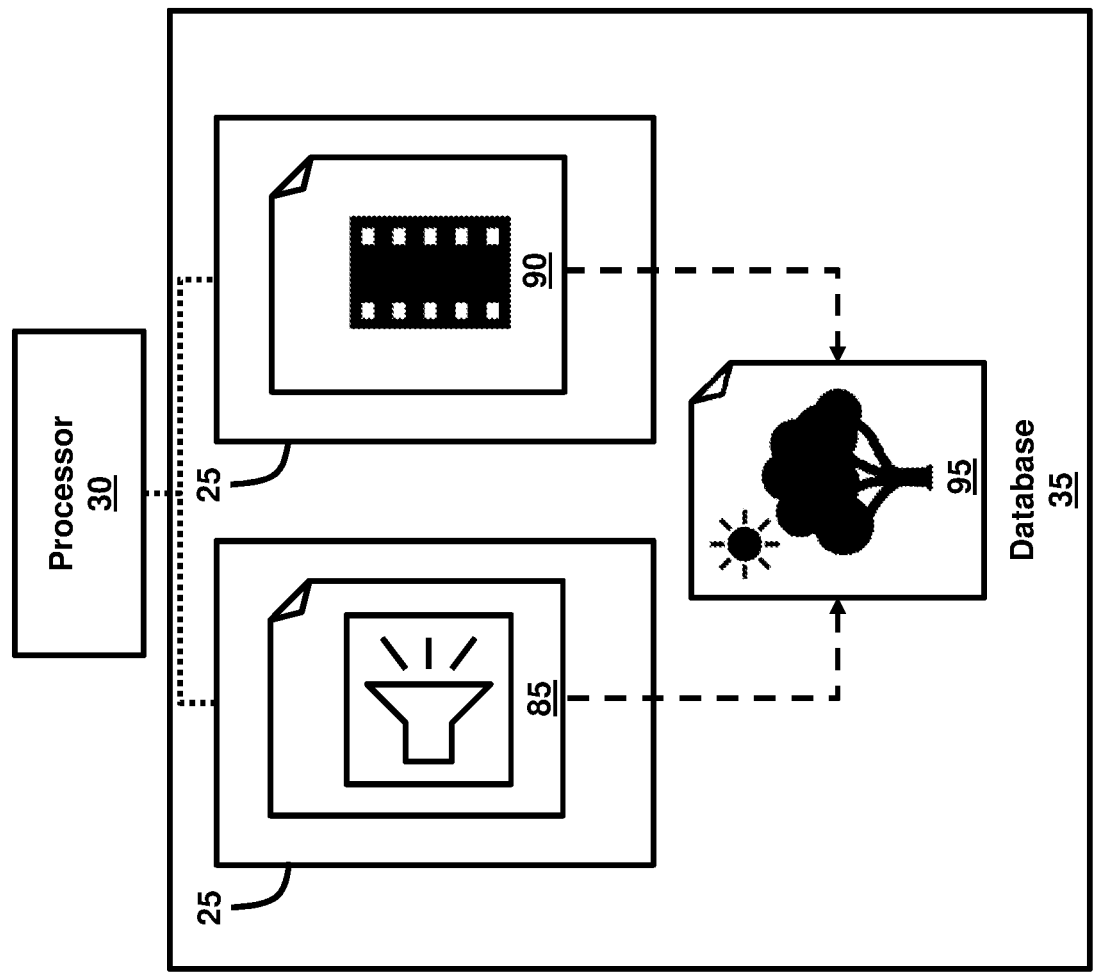

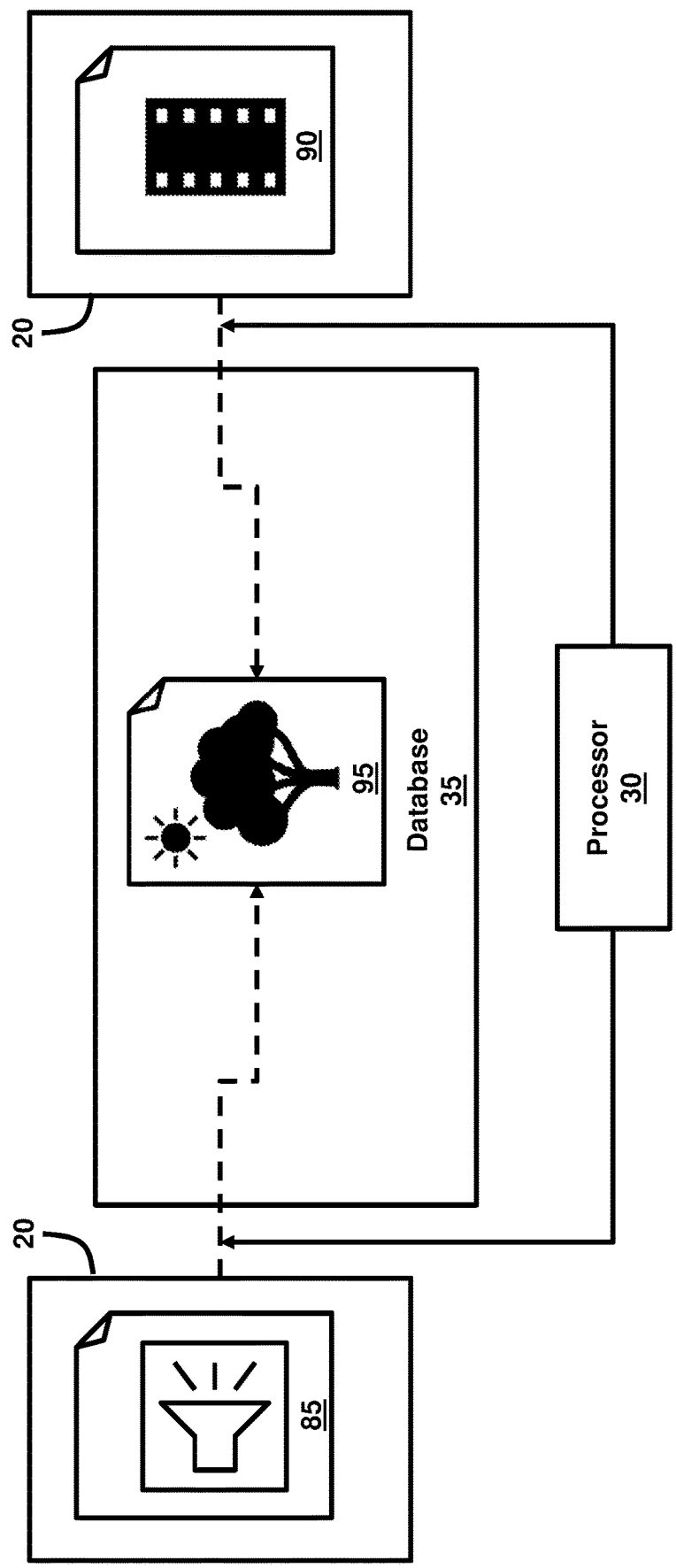

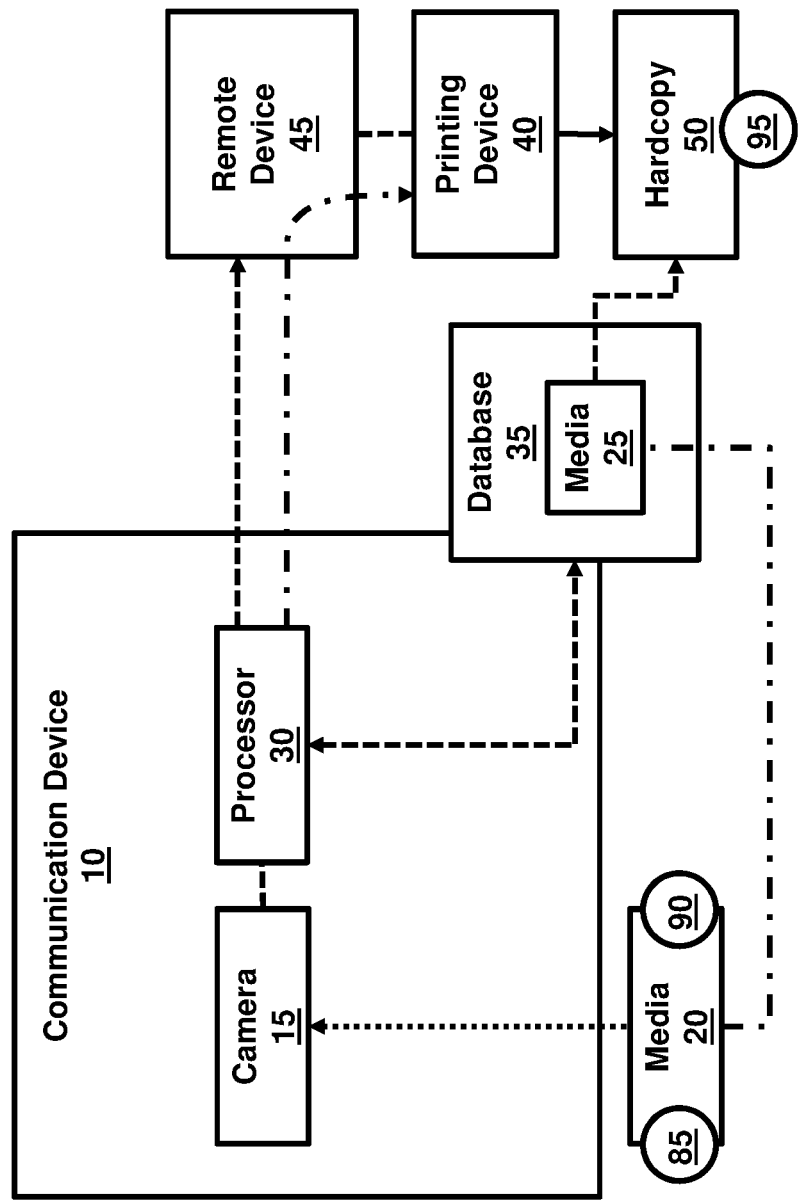

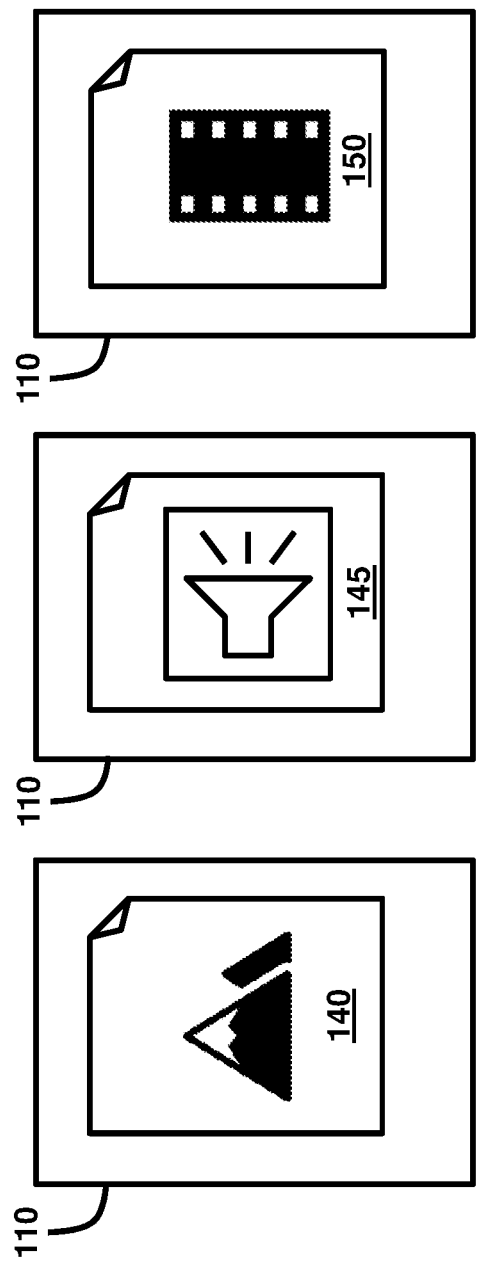

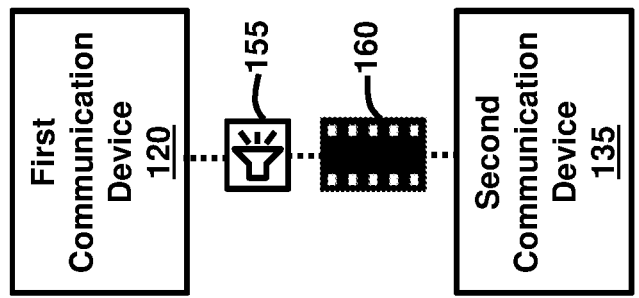
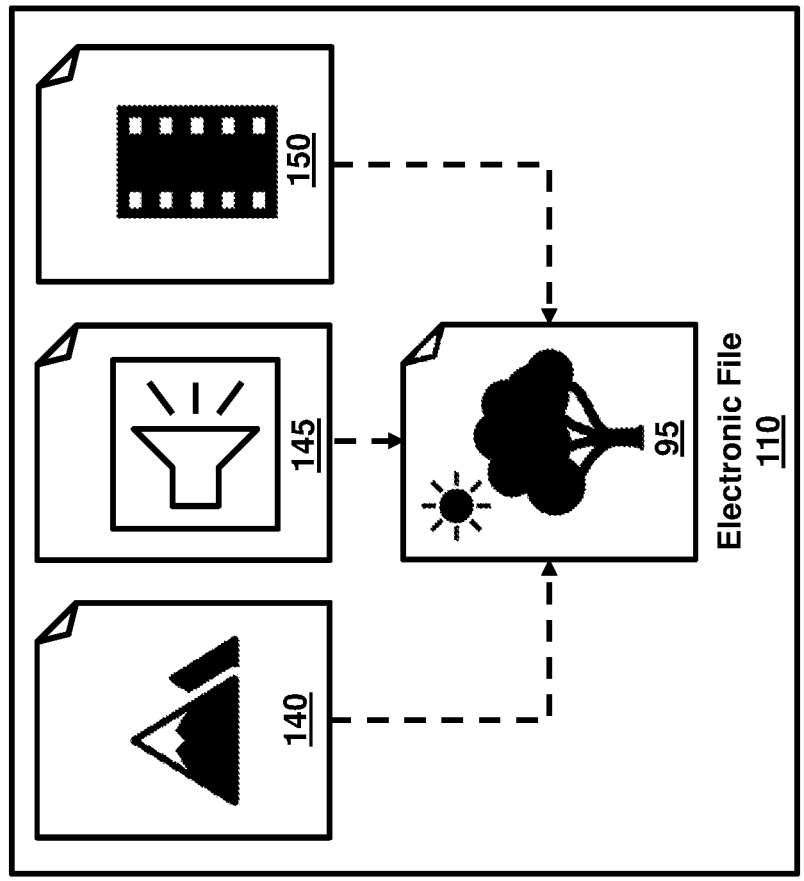

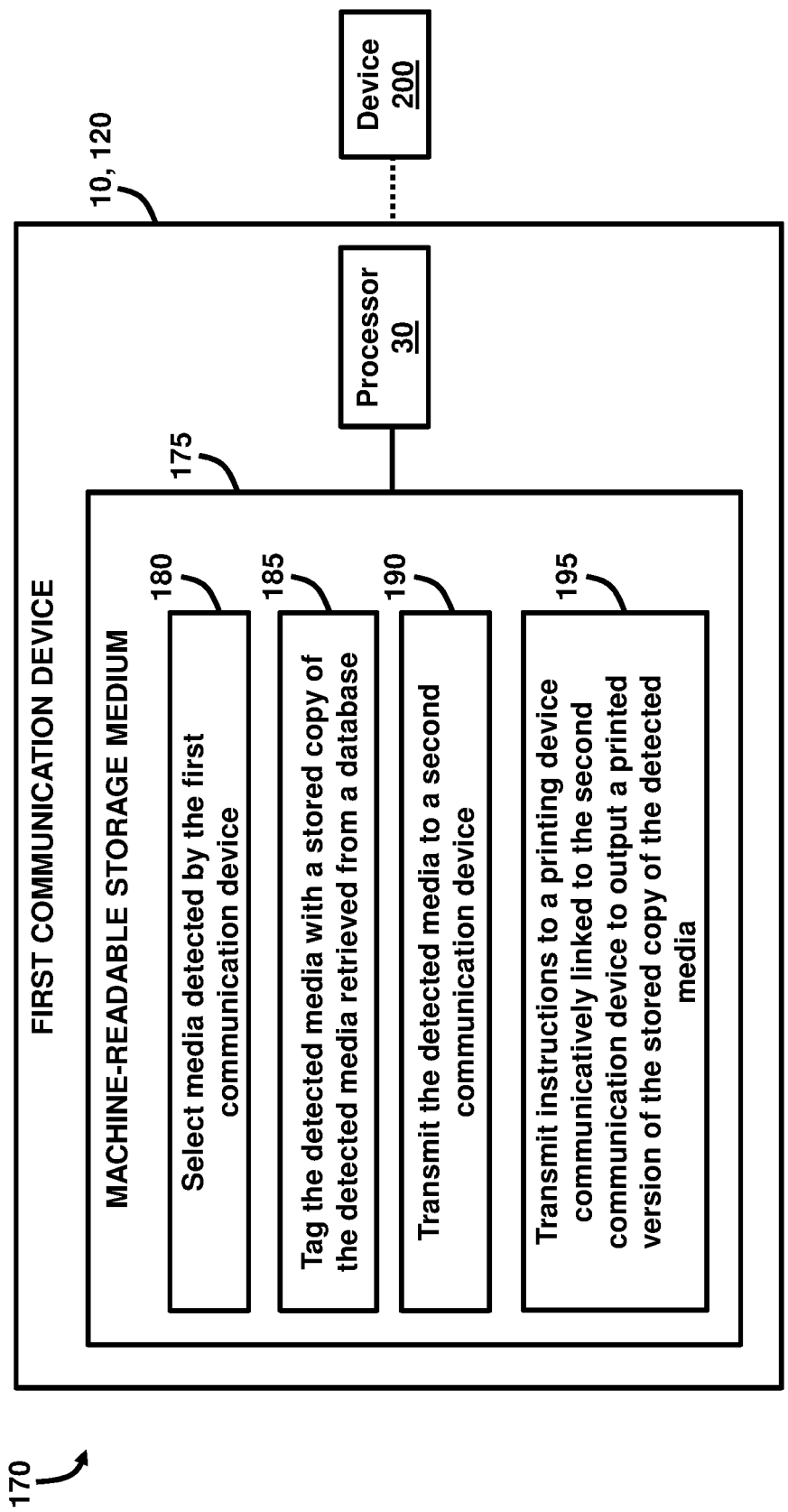

DETECTED MEDIA PRINTING WITH COMMUNICATIVELY LINKED DEVICES

BACKGROUND

Various systems allow users to conduct video or web chats. The conversations can occur remotely including across continents. The chats may occur using smartphone or tablet apps or through web services.

BRIEF DESCRIPTION OF THE DRAWINGS

The following detailed description references the drawings, in which:

FIG. 6A is a block diagram illustrating a processor associating an image with media containing audio, video, or a combination thereof, according to an example.

FIG. 6B is a block diagram illustrating a processor linking detected media containing audio, video, or a combination thereof with an image stored in a database, according to an example.

FIG. 7 is a block diagram illustrating a processor instructing a printing device through a remote device to output a hardcopy of an image, according to an example.

FIG. 9A is a block diagram illustrating various types of electronic files, according to an example.

FIG. 9B is a block diagram illustrating associating an image with electronic files containing an image, audio, video, or a combination thereof, according to an example.

FIG. 10 is a block diagram illustrating a pair of communication devices communicatively linked together, according to an example.

FIG. 14A is a block diagram illustrating a system to manage operation of a communication device for transmitting printing instructions, according to an example.

Figure 1:
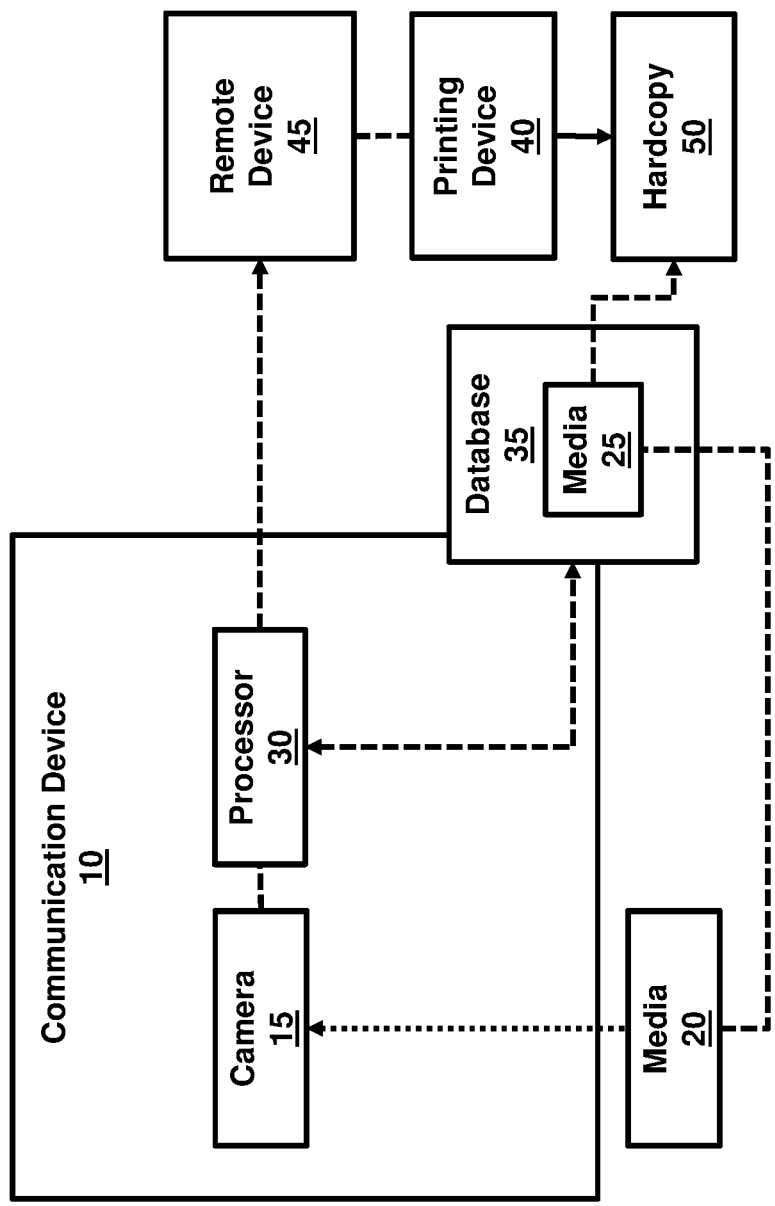
FIG. 1 is a block diagram illustrating a pair of communicatively linked devices and a printing device to output a copy of detected media, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

When having a conversation in a video or web chat, the participants may discuss moments that would be enhanced by the sharing of photos with each other. While video and web chat services allow the participants to transfer media electronically, such transfers are generally relegated to the display screen of each participant's communication device. However, some participants may benefit from an actual hardcopy of the transferred media. For example, some users may not have the visual acuity to properly view images on an electronic display screen, or viewing the transferred image on the screen, the ability to fully conduct the visual chat is diminished. Moreover, sometimes there are multiple participants on one side of the visual or web chat and the capability to share the screen is not practical. Accordingly, the ability to have a hardcopy of transferred images may enhance the visual or web chat experience and allow participants to be fully engaged and be able to share media across remote distances.

An example system operates in a video or web chat scenario between a first communication device and a second communication device. A technique is provided to detect media by the first communication device, compare the displayed media with previously-stored media in a database, retrieve a copy of the detected media from the database, and allow printing of the detected media on a printing device linked to the second communication device. The technique allows remotely-located users to share media and permit a print out of the shared media. Accordingly, the media may be shared across voice or web chats triggered by showing a picture during the chat.

FIG. 1 illustrates a communication device 10 comprising a camera 15 to detect media 20. The communication device 10 may comprise any suitable electronic device capable of facilitating a video or web chat including running apps used for the chat. In some examples, the communication device 10 may comprise a smartphone, tablet computer, laptop computer, desktop computer, or any other communication device with a display screen. The camera 15 may be embedded with the communication device 10 or it may be a separate component that is linked to the communication device 10. The camera 15 may be the same component used by a user to engage in the video or web chat, according to an example. In another example, the camera 15 may be separate from the camera used to engage in the video or web chat. In some examples, the media 20 may comprise an image, audio, video, or a combination thereof. The camera 15 may search for any media 20 that is presented within its image capture/detection zone. In an example, the camera 15 may automatically capture; i.e., take a picture of, the media 20 once detected. In another example, the camera 15 detects and captures the media 20 at a predetermined position with respect to the camera 15 or the communication device 10. Furthermore, a user may initiate the camera 15 to capture the media 20 according to another example.

A processor 30 is provided to link the detected media 20 with media 25, which is a stored version of the detected media 20 in a database 35. In an example, the media 20 may be previously stored in the database 35 as media 25. The processor 30 may be embedded in the communication device 10 or may be part of a separate component or system, according to some examples. Similarly, the database 35 may be embedded in the communication device 10 or may be part of a separate component or system. In an example, the processor 30 is provided to read the media 20 detected by the camera 15 and utilizes image matching instructions to search the database 35 for media 25, which is a copy of the media 20, and to tag the media 25 as being the copy of the media 20. According to another example, the media 20 comprises a steganographic code that is detectable by the camera 15 for image processing by the processor 30. In another example, once the camera 15 detects and captures the media 20, the processor 30 stores the detected media 20 in the database 35 as media 25.

Then, the processor 30 instructs a printing device 40 associated with a remote device 45 to output a hardcopy 50 of the media 25; e.g., the stored version of the detected media 20. The remote device 45 may be another communication device capable of facilitating a video or web chat including running apps used for the chat. In some examples, the remote device 45 may comprise a smartphone, tablet computer, laptop computer, desktop computer, or any other communication device with a display screen. As such, the communication device 10 and the remote device 24 may be communicatively linked to perform the video or web chat. The printing device 40 may be linked to the remote device 45 through a wired or wireless connection. In an example, the printing device 40 may comprise any type of printer including an inkjet printer, a laser printer, a 3D printer, etc. The hardcopy 50 permits a user of the remote device 45 to physically hold/view a copy of the media 20 even though the remote device 45 is remotely located from the communication device 10 and the media 20. In the example of a 3D printer, the media 20 may be an object and the media 25 stored in the database 35 may be an electronic copy of the media 20; e.g., object, including the dimensions, configurations, and other structural attributes associated with the object. The electronic copy of the media 20 in this example may be a design file, such as a computer-aided design file or some other electronic file usable by the printing device 40 to generate the object. Thereafter, in the example of the printing device 40 being a 3D printer, the processor 30 may instruct the printing device 40 associated with the remote device 45 to output a hardcopy 50 of the media 25; i.e., print a 3D object that is a copy of the media 25, which is an electronic stored version of media 20.

In some examples, the processor 30 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

In some examples, the processor 30 may comprise a central processing unit (CPU) of the communication device 10. In other examples the processor 30 may be a discrete component independent of other processing components in the communication device 10. In other examples, the processor 30 may be a microprocessor, microcontroller, hardware engine, hardware pipeline, and/or other hardware-enabled device suitable for receiving, processing, operating, and performing various functions required by the communication device 10. The processor 30 may be provided in the communication device 10, coupled to the communication device 10, or communicatively linked to the communication device 10 from a remote networked location, according to various examples.

Figure 2:
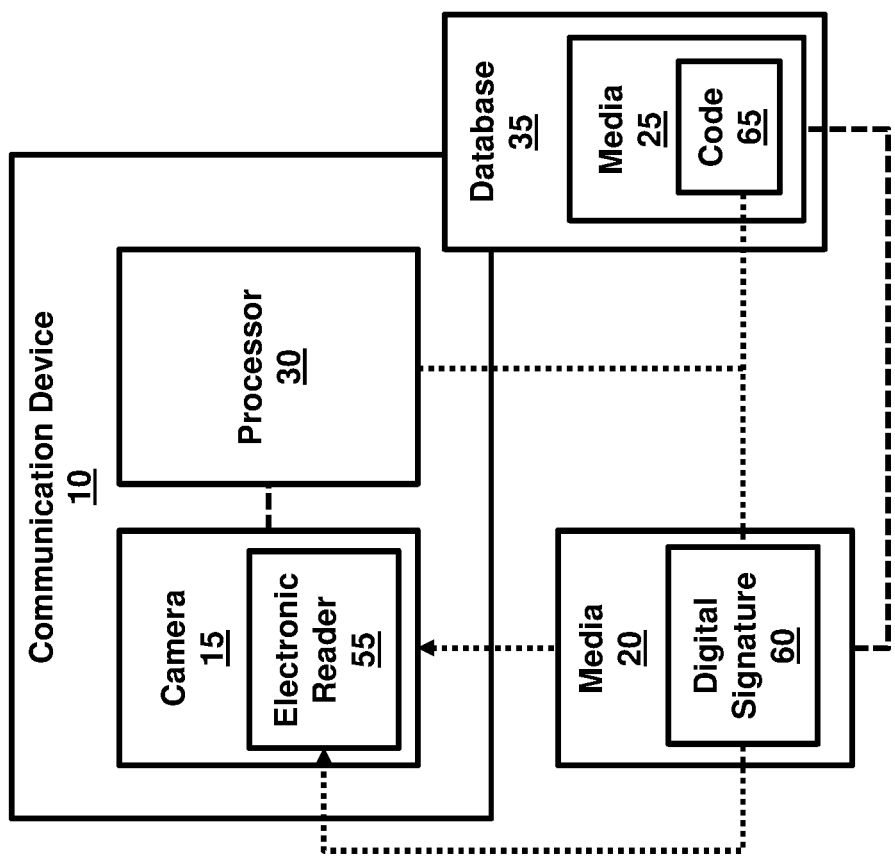
FIG. 2 is a block diagram illustrating the communication device of FIG. 1 with an electronic reader to detect an embedded digital signature of detected media, according to an example.

FIG. 2, with reference to FIG. 1, illustrates an example of the communication device 10 comprising an electronic reader 55 linked to the camera 15 to detect an embedded digital signature 60 associated with the detected media 20. According to an example, the digital signature 60 may be an electronic code that is embedded in or provided on the media 20, which the electronic reader 55 is programmed to detect. In an example, the electronic reader 55 may be a digital scanner, barcode scanner, image scanner, radio frequency identification sensor, etc. and may be part of the communication device 10 or may be a separate component or part of a separate system. In various examples, the electronic reader 55 may be set to automatically search for the embedded digital signature 60 upon being directed towards the media 20, or the communication device 10 may comprise a switch, graphical user interface, or other button, which upon being engaged by a user, triggers the electronic reader 55 to search and detect the embedded digital signature 60 associated with the media 20.

According to an example, the processor 30 is to compare the digital signature 60 with a code 65 associated with the media 25; e.g., the stored version of the detected media 20. In an example, the digital signature 60 and the code 65 may each comprise a sequence of electronic binary numbers, alphanumeric characters, or symbols such as, for example, a barcode or QR code, etc. readable by the camera 15 and/or the electronic reader 55, or the digital signature 60 and the code 65 may be a radio-frequency identification tag. In an example, the media 25 may be pre-programmed with the code 65 stored in the database 35 such that the code 65 is set to be linked to the digital signature 60, and any media 20 containing the digital signature 60 is linked to the media 25 due to the pre-programmed code 65. In this regard, the processor 30 is able to tag or otherwise match the detected media 20 with the stored media 25 in the database 35 using the digital signature 60 and code 65.

Figure 3:
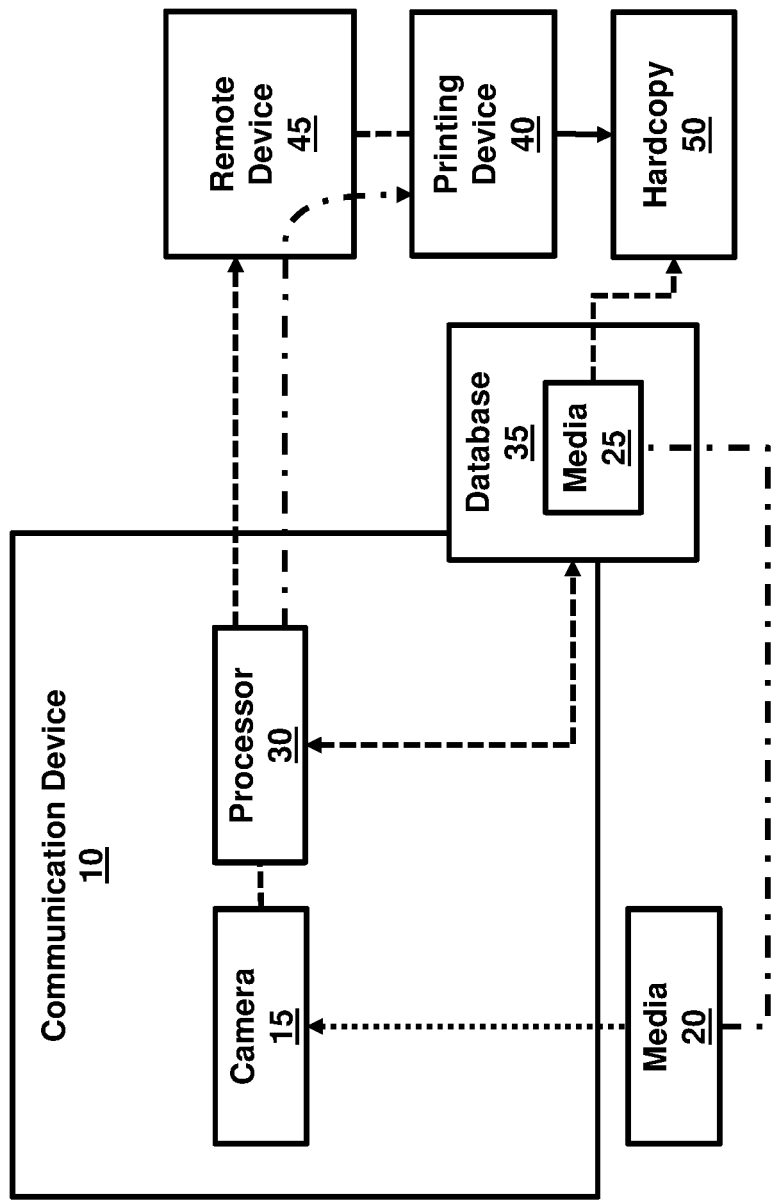
FIG. 3 is a block diagram illustrating a processor interacting with a printing device through a remote communication device, according to an example.

In one example as shown in FIG. 3, with reference to FIGS. 1 and 2, the processor 30 is to instruct the printing device 40 to automatically output the hardcopy 50 upon linking the detected media 20 with the media 25; e.g., the stored version of the detected media 20. In an example, the processor 30 transmits instructions to the remote device 45, which then sends the instructions to the printing device 40 to print the hardcopy 50. The processor may link the detected media 20 with the media 25 stored in the database 35 using the tagging process described above with respect to the electronic reader 55, digital signature 60, and code 65. Accordingly, once the tagging occurs, the processor 30 may automatically transmit the instructions for the printing device 40 to output the hardcopy 50 without requiring any user intervention.

Figure 4:
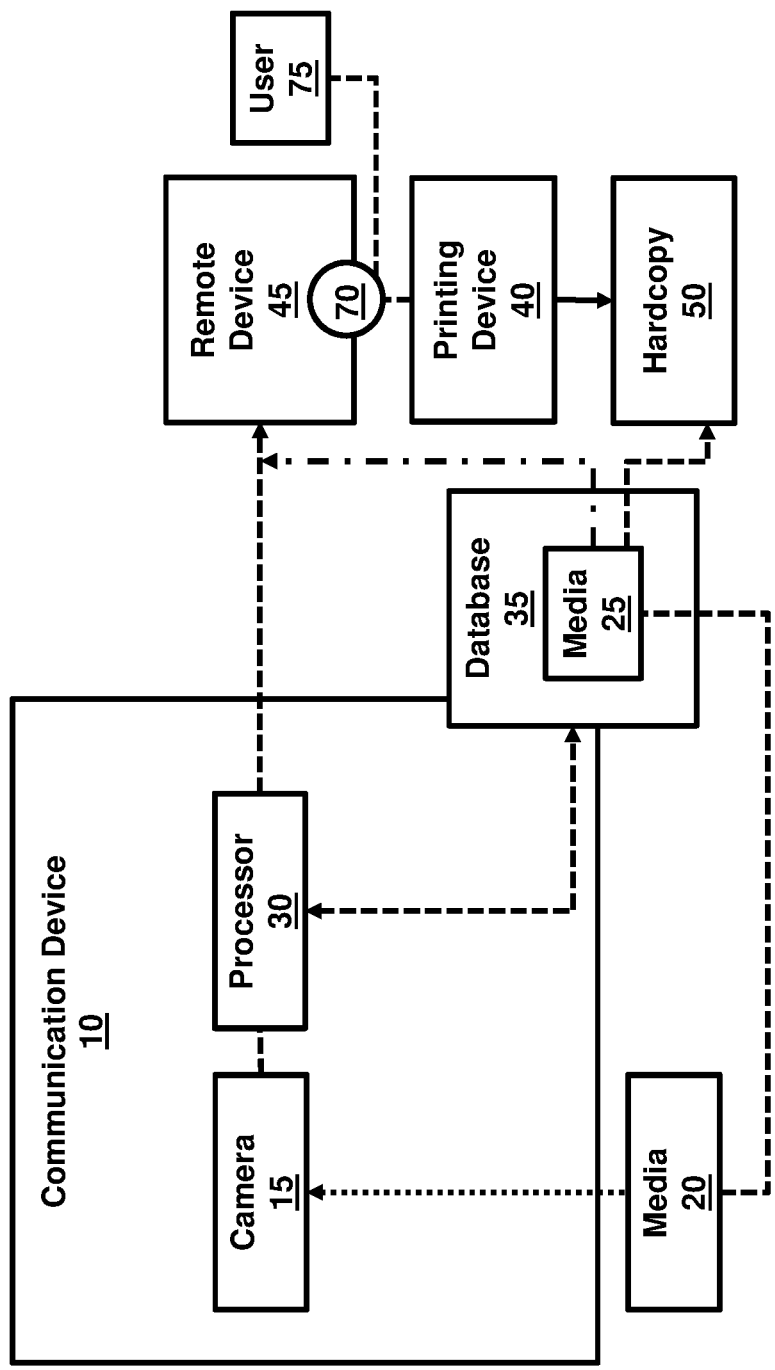
FIG. 4 is a block diagram illustrating a processor transmitting media to a remote device and generating a message for a user, according to an example.

According to an example as illustrated in FIG. 4, with reference to FIGS. 1 through 3, the processor 30 is to transmit the media 25; e.g., the stored version of the detected media 20 to the remote device 45, and generate a message 70 output by the remote device 45 for a user 75 to select whether to instruct the printing device 40 to output the hardcopy 50 of the media 25; e.g., the stored version of the detected media 20. The message 70 may be any of an audio message, a video message, a pop-up text message, or any other type of electronic communication output by the remote device 45 indicating to the user 75 of the remote device 45 that the user 75 may instruct the printing device 40 to output the hardcopy 50 of the media 25. In this regard, rather than automatically instructing the printing device 40 to output the hardcopy 50; e.g., as described with reference to FIG. 3, in the current example of FIG. 4, user intervention is utilized to ensure that the user 75 of the remote device 45 authorizes and actually desires the hardcopy 50 to be printed by the printing device 40.

Figure 5:
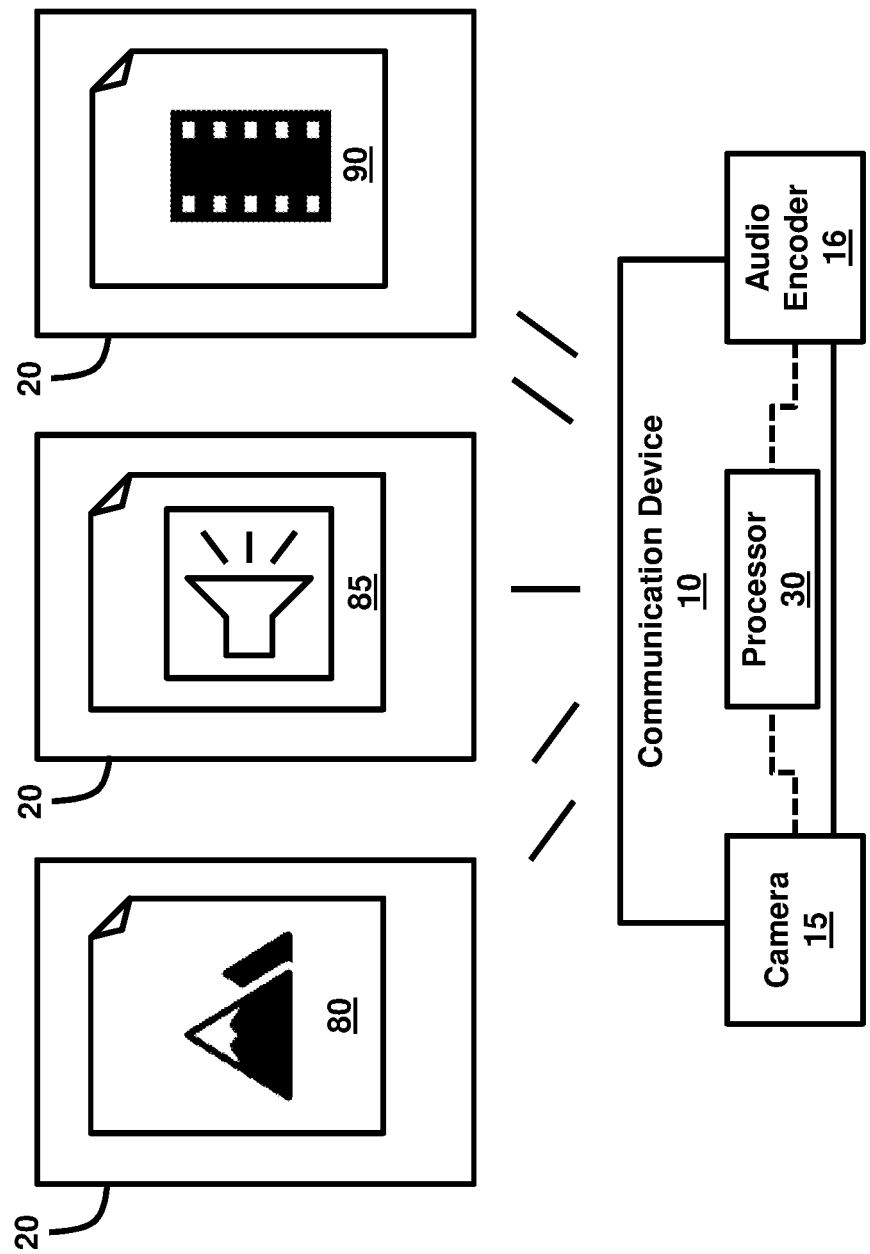
FIG. 5 is a block diagram illustrating various types of detected media, according to an example.

As shown in FIG. 5, with reference to FIGS. 1 through 4, the detected media 20 may comprise any of an image 80, audio 85, and video 90, according to various examples. For example, as an image 80, the media 20 may be photograph or may be a print out on a sheet of paper or other type of printable media. As audio 85, the media 20 may be music, a ring tone, or any other type of audible media. As video 90, the media 20 may be a live video feed or may be previously stored video presented on a display screen. As an image 80, the media 20 may be detected by the camera 15 and processed by the processor 3 for linking to the stored media 25 as described above. As audio 85, the communication device 10 may comprise, or may be operatively connected to, an audio encoder 16 to detect the audio 85. In an example, the audio encoder 16 may be a microphone and may be linked to the camera 15. In another example, the camera 15 and the audio encoder 16 may be coupled together. As video 90, the camera 15 may work with the audio encoder 16 to detect the video 90. In the example of a video 90, the video 90 may be embedded with the digital signature 60 for detection by the electronic reader 55. In the example of audio 85, the audio 85 may be embedded with the digital signature 60, which may be in the form of a high frequency audio code embedded in the audio 85, and which may not be detectable to the human ear. In this regard, the digital signature 60 may be detected by the electronic reader 55, which may be linked to the audio encoder 16, according to an example. Furthermore, in another example, the digital signature 60 may be detected directly by the audio encoder 16 without use of the electronic reader 55. The corresponding media 25 stored in the database 35 may be in the same format as any of the image 80, audio 85, or video 90. In some examples, the media 20 may be any suitable combination of the image 80, audio 85, and video 90. Furthermore, the corresponding media 25 stored in the database 35 may also be a similar combination of the image 80, audio 85, and video 90. The tagging process utilized by the processor 30 may work similarly whether the media 20, 25 are images 80, audio 85, and/or video 90 such that the media 25 may contain the code 65 to facilitate the tagging process to link with the digital signature 60 associated with the image 80, audio 85, and/or video 90.

In an example shown in FIG. 6A, with reference to FIGS. 1 through 5, the processor 30 is to associate an image 95 with media 25, which is stored in the database 35, containing any of audio 85 and video 90. In this regard, the media 25 that contains audio 85 and/or video 90 may be automatically represented by an image 95. According to an example shown in FIG. 6B, with reference to FIGS. 1 through 6A, the processor 30 is to link detected media 20 containing any of audio 85 and video 90 with the associated image 95 stored in the database 35. The processor 30 may use any suitable type of tagging process to perform the linking of the detected media 20 with the image 95.

FIG. 7, with reference to FIGS. 1 through 6B, illustrates that the processor 30 is to instruct the printing device 40 to output a hardcopy 50 of the associated image 95 upon the camera 15 capturing any of audio 85 and video 90, according to an example. Here, the media 25 that contains audio 85 and/or video 90 that is represented by an image 95 is processed by the processor 30 such that the processor 30 may then instruct the printing device 40 via the remote device 45 to output a hardcopy 50 of the image 95.

Figure 8:
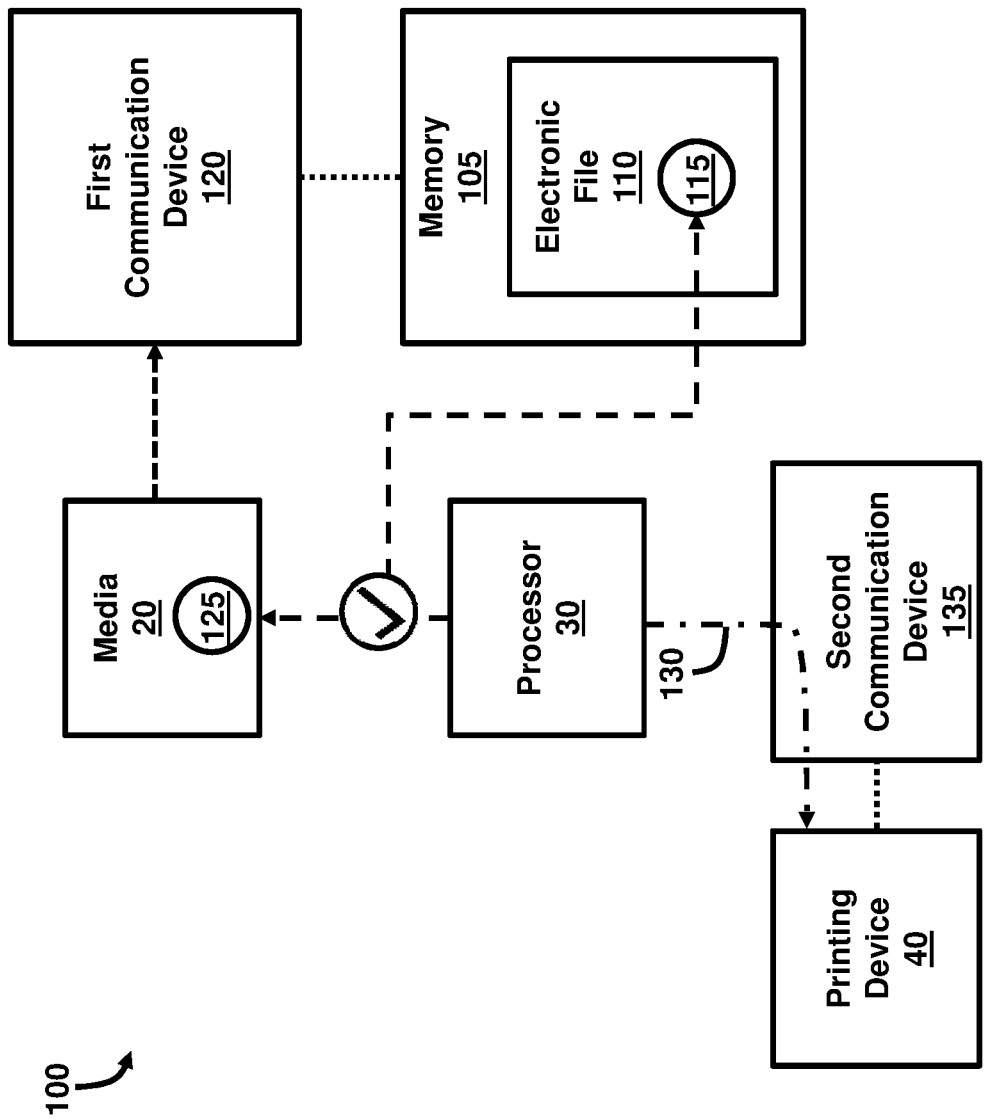
FIG. 8 is a block diagram illustrating a video conferencing system with a first and second communication device and a printing device, according to an example.

FIG. 8, with reference to FIGS. 1 through 7, illustrates an example of a video conferencing system 100 comprising a memory 105 to store an electronic file 110 containing a first code 115. The video conference system 100 may utilize online conference call platforms such as the Skype® system, GoToMeeting® system, and WebEx® systems, among others for linking various participants in a video or web chat. The memory 105 may be Random Access Memory, Read-Only Memory, a cache memory, or other type of storage mechanism, according to an example. An example of the electronic file 110 may be a computer file containing data. In an example, the first code 115 may comprise a sequence of electronic binary numbers, alphanumeric characters, or symbols such as, for example, a barcode or QR code, etc., or may be a radio-frequency identifier. The video conferencing system 100 also contains a first communication device 120 operatively connected to the memory 105 to automatically detect media 20 comprising a second code 125. The first communication device 120 may comprise any suitable electronic device capable of facilitating a video or web chat including running apps used for the chat. In some examples, the first communication device 120 may comprise a smartphone, tablet computer, laptop computer, desktop computer, or any other communication device with a display screen. In an example, the second code 125 may comprise a sequence of electronic binary numbers, alphanumeric characters, or symbols such as, for example, a barcode or QR code, etc., or may be a radio-frequency identification tag. The first communication device 120 may contain suitable components to detect media 20 that is within a detectable range of the first communication device 120. For example, the first communication device 120 may comprise hardware components such as a camera 15, audio encoder 16, or electronic reader 55, as described above with respect to FIG. 2, to facilitate the detection of the media 20.

The video conferencing system 100 also includes a processor 30 to compare the first code 115 with the second code 125. The processor 30 is to transmit a printing-execution command 130 to a printing device 40 that is communicatively linked to a second communication device 135 upon determining that the first code 115 matches the second code 125. In an example, the electronic file 110 may be pre-programmed with the first code 115 stored in the memory 105 such that the first code 115 is set to be linked to the second code 125, and any media 20 containing the second code 125 is linked to the electronic file 110 due to the pre-programmed first code 115. In this regard, the processor 30 is able to tag or otherwise match the detected media 20 with the stored electronic file 110 in the memory 105 using the first and second codes 115, 125. The second communication device 135 may comprise any suitable electronic device capable of facilitating a video or web chat including running apps used for the chat. In some examples, the second communication device 135 may comprise a smartphone, tablet computer, laptop computer, desktop computer, or any other communication device with a display screen. In an example, the printing-execution command 130 may comprise an electronic signal containing instructions sent by the processor 30 to the printing device 40 via the second communication device 135.

FIG. 9A, with reference to FIGS. 1 through 8, indicates that the electronic file 110 comprises any of an image file 140, an audio file 145, and a video file 150, according to various examples. The electronic file 110 may be provided in any suitable size or format, and may be transferrable between the first and second communication devices 120, 135 or between the memory 105 and any of the first and second communication devices 120, 135 by wireless or wired transmission. In an example illustrated in FIG. 9B, with reference to FIGS. 1 through 9A, the electronic file 110 comprises an image 95 associated with any of the image file 140, the audio file 145, and the video file 150. In this regard, the electronic file 110 may be represented by the image 95 irrespective of the type of data; e.g., whether the electronic file 110 is an image file 140, an audio file 145, or a video file 150.

Figure 11:
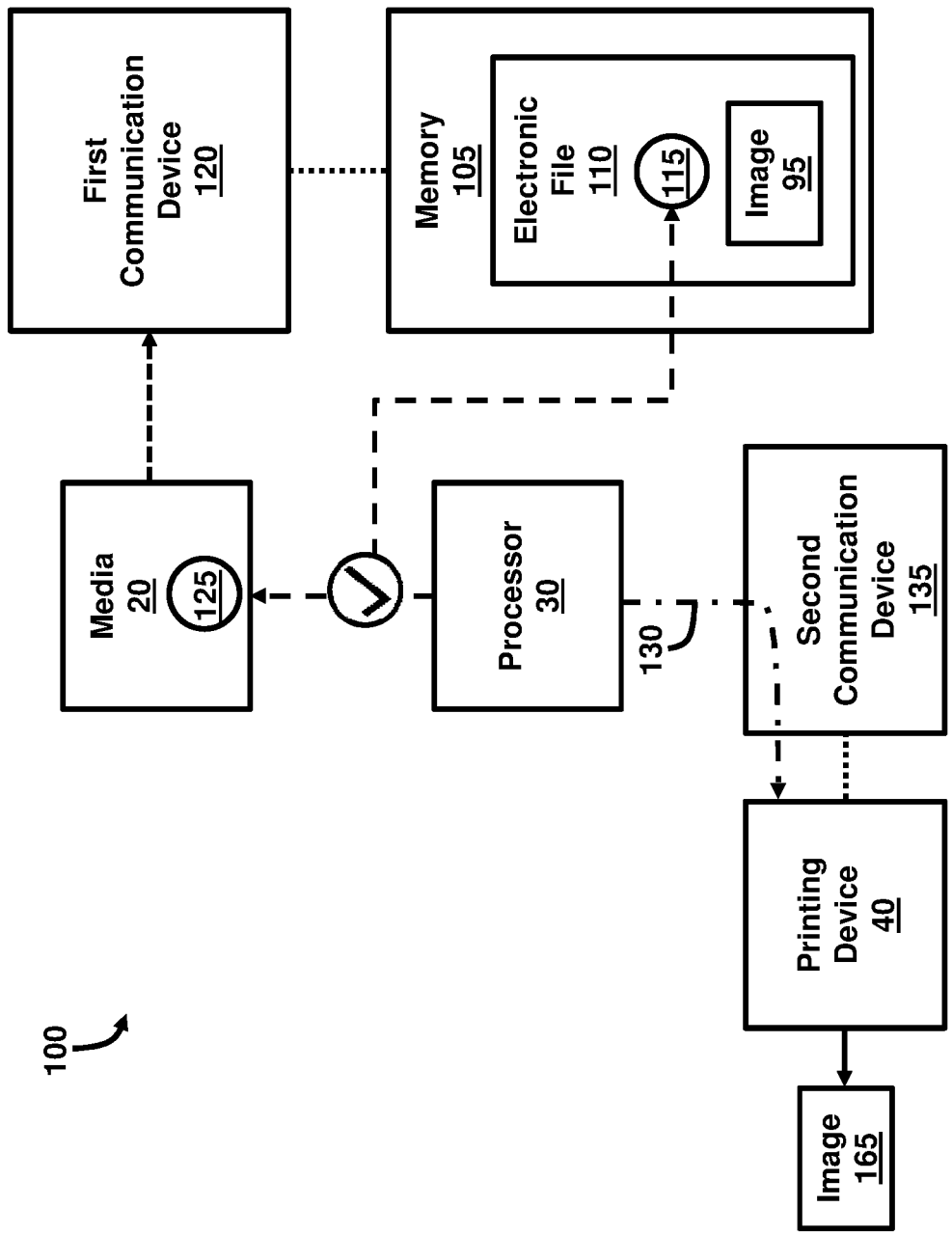
FIG. 11 is a block diagram illustrating the video conferencing system of FIG. 8 with the printing device outputting an image, according to an example.

According to an example illustrated in FIG. 10, with reference to FIGS. 1 through 9B, the first communication device 120 and the second communication device 135 are communicatively linked to transfer any of audio 155 and video 160 therebetween. In this regard, during the video or web chat, the audio 155 and video 160 may be transferred between the first and second communication devices 135. Moreover, as shown in FIG. 11, with reference to FIGS. 1 through 10, the printing-execution command 130 is to cause the printing device 40 to print an image 165. The image 165 may correspond with the image 95 representative of the electronic file 110, in an example.

Figure 12:
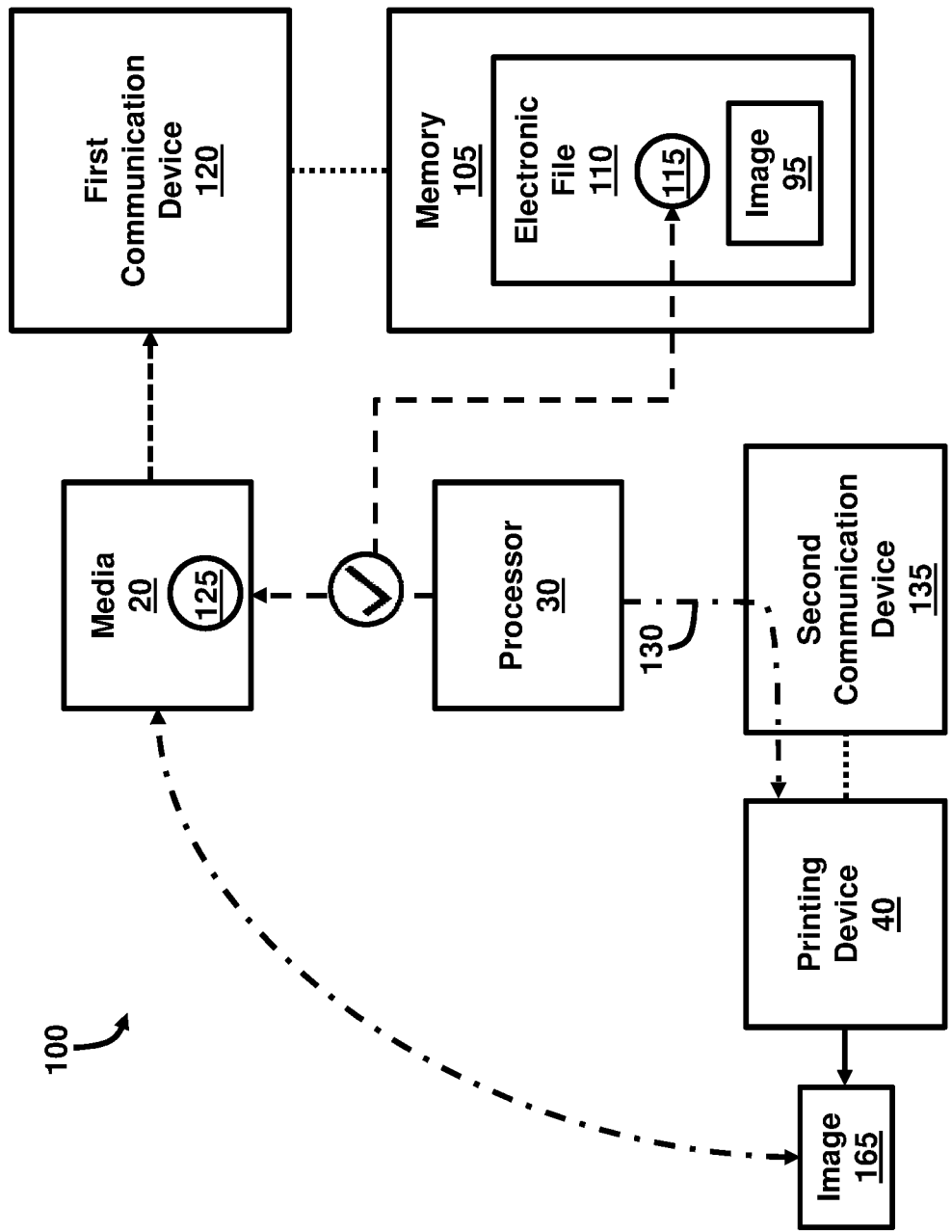
FIG. 12 is a block diagram illustrating the video conferencing system of FIG. 8 with the printing device outputting an image with a quality comparable to the image quality of detected media, according to an example.

As shown in FIG. 12, with reference to FIGS. 1 through 11, in one example, an image quality of the printed image 165 is comparable to an image quality of the detected media 20 as represented by the image 95. In this regard, the user of the second communication device 135 is able to have an image 165 that is comparable in quality to the original media 20 as represented by the image 95. Thus, if the media 20 is a photograph, then the image 165 that is output by the printing device 40 is of comparable photographic quality subject to the type of paper used by the printing device 40 and the print settings of the printing device 40, etc.

Figure 13:
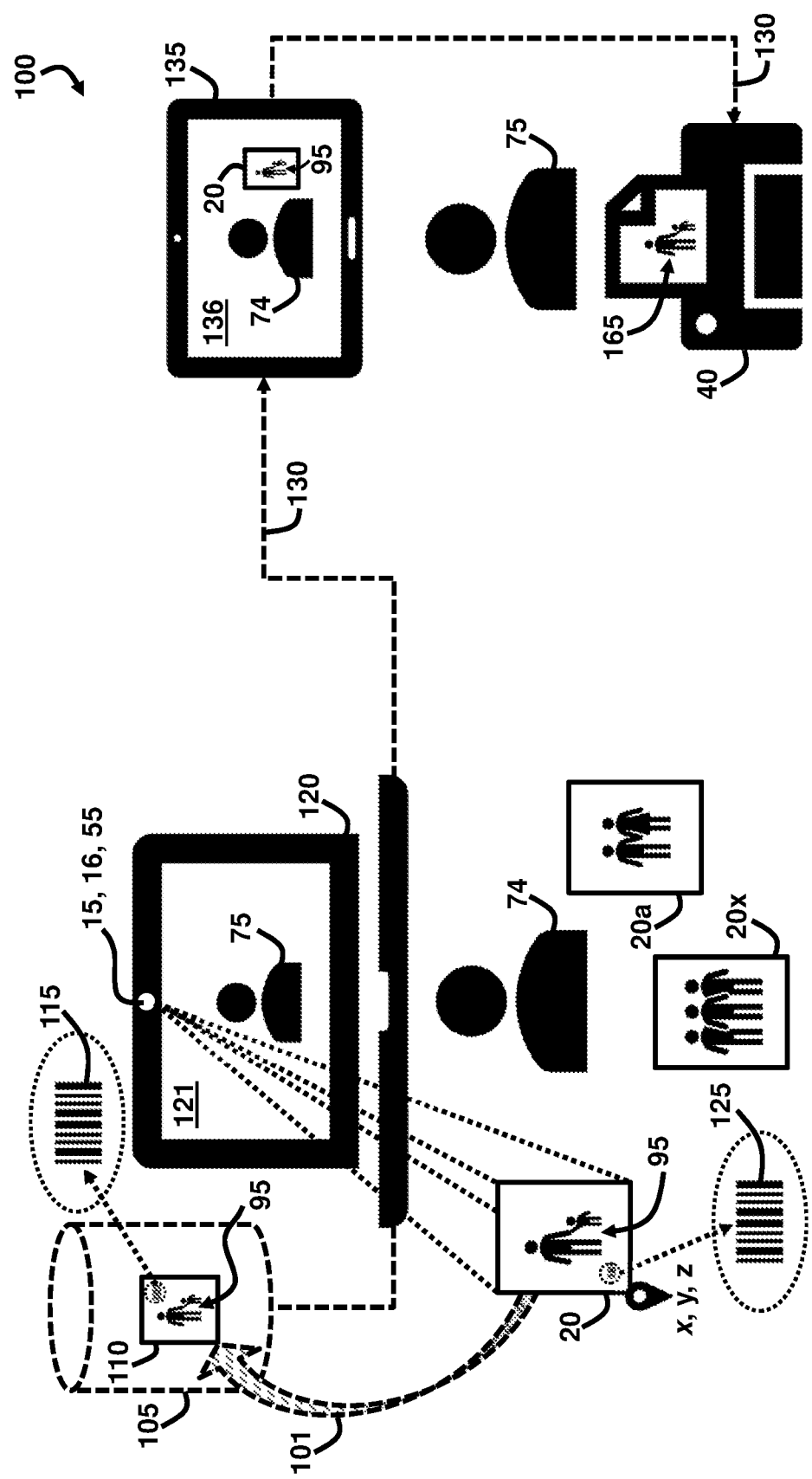
FIG. 13 is a schematic diagram illustrating the video conferencing system of FIG. 8 with linked communication devices sharing media for printing, according to an example.

FIG. 13, with reference to FIGS. 1 through 12, illustrates an example schematic diagram of the video conferencing system 100. A user 74 associated with a first communication device 120 may conduct a video or web chat with a user 75 associated with a second communication device 135. The first communication device 120 and the second communication device 135 may be the same type of device; e.g., both communication devices 120, 135 may be a smartphone, laptop computer, or tablet computer, etc., or the communication devices 120, 135 may be different types of devices; e.g., the first communication device 120 may be a different type of device compared with the second communication device 135. The user 74 is able to view the user 75 on the first display screen 121 of the first communication device 120, and likewise the user 75 is able to view the user 74 on the second display screen 136 of the second communication device 135. Additionally, the user 74 is able to view any other aspects of the environment adjacent to the user 75 that is captured by the second communication device 135 and presented on the first display screen 121 of the first communication device 120. Likewise, the user 75 is able to view any other aspects of the environment adjacent to the user 74 that is captured by the first communication device 120 and presented on the second display screen 136 of the second communication device 135. For example, the user 74 may present media 20 for viewing by the user 75 on the second display screen 136 of the second communication device 135.

In the example shown in FIG. 13, the media 20 may contain an image 95, and references to images are indicated with respect to FIG. 13. However, as indicated above, the video conferencing system 100 may be utilized when the media 20 contains audio or video also. The media 20 may have been previously stored electronically in the memory 105 of the first communication device 120 such that the media 20 is stored as an electronic file 110, and the media 20 is identified with a first code 115. Furthermore, the electronic file 110 comprising the media 20 contains the image 95.

Any of the camera 15, audio encoder 16, and electronic reader 55, alone or in combination with each other, may detect the media 20 by detecting the second code 125 associated with the media 20. In an example, the detection may occur by placing the media 20 at a specified location x, y, z with respect to the first communication device 120. In the video or web chat, the user 75 associated with the second communication device 135 may be able to view the media 20 containing the image 95 on the second display screen 136 once the camera 20, audio encoder 16, and/or electronic reader 55 of the first communication device 120 detects the media 20. Thereafter, the processor 30, which is not shown in FIG. 13, of the first communication device 120 may perform the tagging process 101 to determine whether the first code 115 matches the second code 125. If there is a match, then first communication device 120 transmits the printing-execution command 130 to the second communication device 135 for further transmission to the printing device 40, which is communicatively linked to the second communication device 135. This process permits the printing device 40 to output the image 165 such that the image 165 may correspond with the image 95 representative of the electronic file 110 and the detected media 20. While FIG. 13 only depicts the second communication device 135 being communicatively linked to the printing device 40, the first communication device 120 may also be communicatively linked to its own printing device, which is not shown in the drawings, and accordingly, the entire process may occur in reverse; i.e., with the second communication device 135 detecting media and the printing device associated with the first communication device 120 printing a hardcopy of the detected media.

The system 100 also provides for selectively choosing the detected media 20 from among a set of media 20, 20a . . . 20x based on performing a sensitivity analysis on the set of media 20, 20a . . . 20x, as further described below. The sensitivity analysis may be programmed into the first communication device 120 and may be tuned to provide enhanced selection of various media 20, 20a . . . 20x that are capable of being detected by the first communication device 120.

Accordingly, the system 100 allows users 74, 75 to video/web chat and during the video/web chat print out relevant images 165, such as photos that are being shared during the video/web chat. As such, the system 100 allows the users 74, 75 to share media 20 in a tangible way by permitting each user 74, 75 to have a hardcopy of the media 20 even though the users 74, 75 are remotely located from one another. Furthermore, the system 100 allows the user 75 to print just-in-time as opposed to as an afterthought; e.g., after the video/web chat or by having to receive an electronic version of the media 20, download the media 20, and print the media 20 apart from the video/web chat process.

FIG. 14A, with reference to FIGS. 1 through 12, illustrates an example system 170 to manage operation of a communication device 10 or a first communication device 120. In the example of FIG. 14A, the communication device 10 or the first communication device 120 includes the processor 30 and a machine-readable storage medium 175. Processor 30 may include a central processing unit, microprocessors, hardware engines, and/or other hardware devices suitable for retrieval and execution of instructions stored in a machine-readable storage medium 175. Processor 30 may fetch, decode, and execute computer-executable instructions 180, 185, 190, and 195 to enable execution of locally-hosted or remotely-hosted applications for controlling action of the communication device 10 or the first communication device 120. The remotely-hosted applications may be accessible on remotely-located devices; for example, remote communication device 200. For example, the remote communication device 200 may be a computer, tablet device, smartphone, or remote server. As an alternative or in addition to retrieving and executing instructions, processor 30 may include electronic circuits including a number of electronic components for performing the functionality of the instructions 180, 185, 190, and 195.

The machine-readable storage medium 175 may be any electronic, magnetic, optical, or other physical storage device that stores executable instructions. Thus, the machine-readable storage medium 175 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 175 may include a non-transitory computer-readable storage medium 175. The machine-readable storage medium 175 may be encoded with executable instructions for enabling execution of remotely-hosted applications accessed on the remote communication device 200.

In an example, the processor 30 of the communication device 10 or the first communication device 120 executes the computer-executable instructions 180, 185, 190, and 195. For example, selecting instructions 180 may select media 20 detected by the first communication device 120. Here, the processor 30 selects the media 20, which may be one of several media 20 detected by the communication device 10 or the first communication device 120. In this regard, each of the different media 20 may contain its own unique digital signature 60 or code 125 to differentiate among the media 20. The selection of the media 20 by the processor 30 may occur with or without user intervention and may occur automatically once the media 20 is detected by the communication device 10 or the first communication device 120. In another example, the processor 30 may detect the media 20 once the media is positioned at a specified location x, y, z with respect to the communication device 10 or the first communication device 120. In still another example, the user 74 inputs a command on the communication device 10 or the first communication device 120 to initiate detection of the media 20 for processing by the processor 30.

Next, tagging instructions 185 may tag the detected media 20 with a stored copy; e.g., media 25, of the detected media 20 retrieved from a database 35. In an example, the database 35 may be stored in memory 105. The stored copy may be presented as electronic file 110, according to an example. In an example, the tagging instructions 185 may compare the digital signature 60 associated with the detected media 20 with the code 65 associated with the media 25, which is the stored version of the detected media 20 in the database 35. In another example, the tagging instructions 185 may perform the tagging process 101 described above such that the first code 115 associated with the electronic file 110 is compared and matched with the second code 125 associated with the detected media 20.

After this, transmitting instructions 190 may transmit the detected media 20 to a remote device 45 or a second communication device 135. In an example, the first communication device 120 wirelessly transmits the detected media 20 to the remote device 45 or the second communication device 135. In this regard, according to an example, the detected media 20 is already presented on the second display screen 136 of the remote device 45 or the second communication device 135, but the transmitting instructions 190 allow the detected media 20 to be tangibly transmitted to the remote device 45 or the second communication device 135; e.g., for storage in the memory, which is not shown in the drawings, of the remote device 45 or the second communication device 135. In another example, the transmission of the detected media 20 to the remote device 45 or the second communication device 135 does not result in a permanent storage of the detected media 20 in the second communication device 135, but rather the detected media 20 that is transmitted to the remote device 45 or the second communication device 135 is only temporarily stored for a precalculated period of time. In such an example, the remote device 45 or the second communication device 135 may utilize cache memory, which is not shown in the drawings, to facilitate the temporary storage process.

Thereafter, transmitting instructions 195 may transmit instructions to a printing device 40 communicatively linked to the remote device 45 or the second communication device 135 to output a printed version; e.g., hardcopy 50, of the of the media 25; e.g., the stored copy of the detected media 20, or the printed image 165, etc. In an example, the transmitting instructions 195 may contain the printing-execution command 130, and may be sent wirelessly from the communication device 10 or the first communication device 120 to the remote device 45 or the second communication device 135 for subsequent execution by the printing device 40.

Figure 14B:
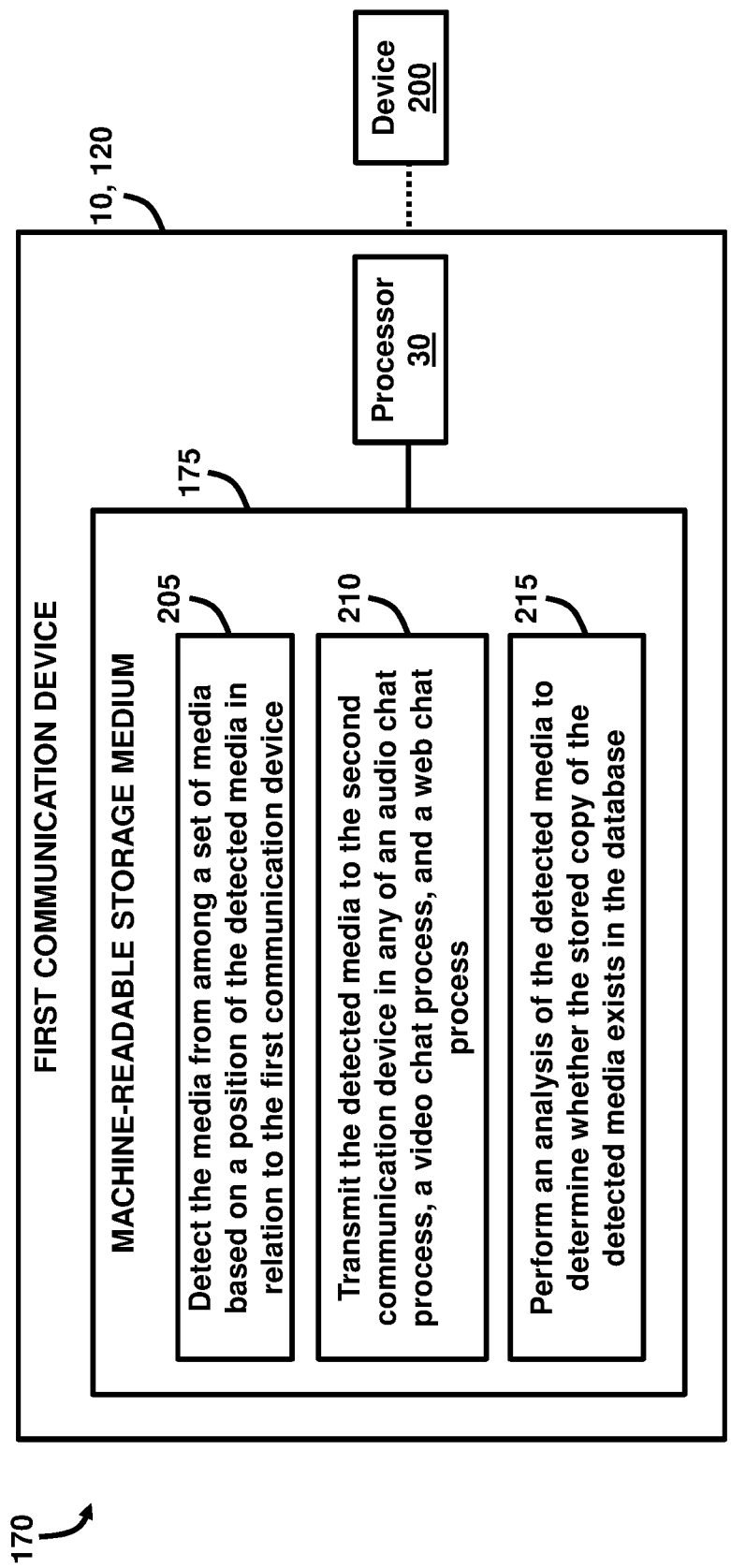
FIG. 14B is a block diagram illustrating a system to manage operation of a communication device for detecting and selecting media to be transmitted, according to an example.

In further examples shown in FIG. 14B, with reference to FIGS. 1 through 14A, the processor 30 of the first communication device 120 executes the computer-executable instructions 205, 210, and 215. For example, detecting instructions 205 may detect the media 20 from among a set of media 20, 20a . . . 20x based on a position x, y, z of the detected media 20 in relation to the communication device 10 or the first communication device 120. The processor 30 may perform sensitivity analysis to decipher from among a set of media 20, 20a . . . 20x, which may be capable of being detected by the communication device 10 or the first communication device 120. According to an example, the sensitivity analysis may be based on the position x, y, z of the detected media 20 in relation to the communication device 10 or the first communication device 120. In another example, the sensitivity analysis may be based on other factors including the type of media 20, 20a . . . 20x, clarity of the media 20, 20a . . . 20x, size of the media 20, 20a . . . 20x, and the respective digital signatures 60 and/or codes 125 associated with the media 20, 20a . . . 20x, among other factors.

Transmitting instructions 210 may transmit the detected media 20 to the second communication device 135 in any of an audio chat process, a video chat process, and a web chat process. For example, as described above, the various types of chat processes may occur in various types of online conference call platforms such as the Skype® system, GoToMeeting® system, and WebEx® systems, among others for linking various users 74, 75 in an audio, video, or web chat.

Performing instructions 215 may perform an analysis of the detected media 20 to determine whether the stored copy; e.g., media 25, of the detected media 20 retrieved from a database 35, of the detected media 20 exists in the database 35. The processor 30 may utilize a matching process, such as tagging process 101 to perform this analysis. The process may involve matching the detected media 20 with media 25 that is stored locally in the communication device 10 or remotely; e.g., through a cloud server.

Accordingly, the system 100 allows users 74, 75 to video/web chat and during the video/web chat print out relevant images 165, such as photos that are being shared during the video/web chat. As such, the system 100 allows the users 74, 75 to share media 20 in a tangible way by permitting each user 74, 75 to have a hardcopy of the media 20 even though the users 74, 75 are remotely located from one another. Furthermore, the system 100 allows the user 75 to print just-in-time as opposed to as an afterthought; e.g., after the video/web chat or by having to receive an electronic version of the media 20, download the media 20, and print the media 20 apart from the video/web chat process.

The present disclosure has been shown and described with reference to the foregoing implementations. Although specific examples have been illustrated and described herein it is manifestly intended that other forms, details, and examples may be made without departing from the scope of the disclosure that is defined in the following claims.

What is claimed is:

1. A communication device comprising:
   a camera to detect media comprising a first code; and
   a processor to:
   link the first code associated with the detected media with a second code associated with a stored version of the detected media in a database; and
   transmit a printing-execution command to a printing device associated with a remote device to cause the printing device to output a hardcopy of the stored version of the detected media, and wherein the communication device is communicatively linked to the remote device to transfer any of audio and video therebetween.

2. The communication device of claim 1, wherein the first code is an embedded digital signature, and further comprising an electronic reader linked to the camera to detect the embedded digital signature associated with the detected media, wherein the processor is to compare the digital signature with the second code associated with the stored version of the detected media.

3. The communication device of claim 1, wherein the processor is to instruct the printing device to automatically output the hardcopy upon linking the detected media with the stored version of the detected media.

4. The communication device of claim 1, wherein the processor is to transmit the stored version of the detected media to the remote device, and generate a message output by the remote device for a user to select whether to instruct the printing device to output the hardcopy of the stored version of the detected media.

5. The communication device of claim 1, wherein the detected media comprises any of an image, audio, and video.

6. The communication device of claim 1, wherein the processor is to associate an image with media containing any of audio and video, and wherein the processor is to link detected media containing any of audio and video with the associated image stored in the database.

7. The communication device of claim 6, wherein the processor is to instruct the printing device to output a hardcopy of the associated image upon the camera capturing any of audio and video.

8. A video conferencing system comprising:
   a memory to store an electronic file containing a first code;
   a first communication device operatively connected to the memory to automatically detect media comprising a second code; and
   a processor to:
   compare the first code with the second code; and
   transmit a printing-execution command to a printing device that is communicatively linked to a second communication device upon determining that the first code matches the second code, wherein the first communication device and the second communication device are communicatively linked to transfer any of audio and video therebetween, and wherein the printing-execution command is to cause the printing device to print an image associated with the electronic file.

9. The video conferencing system of claim 8, wherein the electronic file comprises any of an image file, an audio file, and a video file, and wherein the electronic file comprises an image associated with any of the image file, the audio file, and the video file.

10. The video conferencing system of claim 8, wherein an image quality of the printed image is comparable to an image quality of the detected media.

11. A non-transitory machine-readable storage medium comprising computer-executable instructions that when executed cause a processor of a first communication device to:
- select media detected by the first communication device;
- tag the detected media with a stored copy of the detected media retrieved from a database;
- transmit the detected media to a second communication device in any of an audio chat process, a video chat process, and a web chat process; and
- transmit a printing-execution command to a printing device communicatively linked to the second communication device to cause the printing device to output a printed version of the stored copy of the detected media.

12. The non-transitory machine-readable storage medium of claim 11, wherein the instructions, when executed, further cause the processor to detect the media from among a set of media based on a position of the detected media in relation to the first communication device.

\* \* \* \* \*